United States Patent [19]

Fujii et al.

[11] 4,223,152
[45] Sep. 16, 1980

[54] PROCESS FOR PURIFYING CRUDE ISOINDOLINONE SERIES PIGMENTS

[75] Inventors: Osamu Fujii; Misao Takano; Takeshi Uotani; Eiji Iwamoto, all of Shin Nanyo, Japan

[73] Assignee: Toyo Soda Manufacturing Co., Ltd., Nanyo, Japan

[21] Appl. No.: 26,663

[22] Filed: Apr. 3, 1979

[30] Foreign Application Priority Data

Apr. 5, 1978 [JP] Japan .................................... 53-39262
Apr. 28, 1978 [JP] Japan .................................... 53-49909
Dec. 15, 1978 [JP] Japan .................................... 53-154213

[51] Int. Cl.$^2$ .................. C07D 213/61; C07D 209/50
[52] U.S. Cl. ............................ 546/273; 260/325 PH
[58] Field of Search ................. 546/273; 260/325 PH

[56] References Cited

U.S. PATENT DOCUMENTS

| | | |
|---|---|---|
| 3,496,190 | 2/1970 | von der Crone et al. .... 260/325 PH |
| 3,758,497 | 9/1973 | Pugin et al. ...................... 260/326.1 |
| 3,816,448 | 6/1974 | Bitterli et al. ................. 260/325 PH |
| 3,917,641 | 11/1975 | Bitterli et al. ................. 260/325 PH |

*Primary Examiner*—Donald G. Daus
*Assistant Examiner*—M. C. Eakin
*Attorney, Agent, or Firm*—Cushman, Darby & Cushman

[57] ABSTRACT

Isoindolinone pigments of an extremely high purity, which are represented by the following general formula:

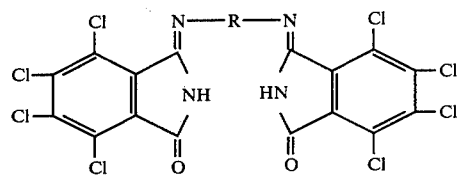

wherein
R represents a carbocyclic bridge member such as:
an unsubstituted phenylene or diphenylene group,
a phenylene or diphenylene group substituted by chlorine atoms, methyl groups or methoxy groups,
or
a group expressed by the formula

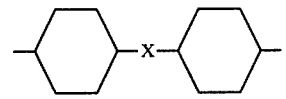

where X is oxygen or a methylene group; or
R represents a heterocyclic bridge member such as: a pyridylene group; or
R represents a direct bond, are prepared by a process wherein a crude isoindolinone pigment is dispersed in an aromatic hydrocarbon; (a) an alcoholate or hydroxide of an alkali metal and (b) a lower alcohol and/or water are incorporated in the crude isoindolinone pigment dispersion thereby forming an alkali metal salt of the isoindolinone pigment; and then, the so formed pigment salt is contacted with an acid thereby hydrolyzing the pigment salt into the free acid form.

14 Claims, No Drawings

PROCESS FOR PURIFYING CRUDE ISOINDOLINONE SERIES PIGMENTS

BACKGROUND OF THE INVENTION

1. Field of the Invention

This invention relates to a process for purifying crude isoindolinone series pigments. More particularly, it relates to a process for producing isoindolinone series pigments which are characterized as exhibiting extremely enhanced purity, color definition and chroma, as well as good fastness to light, chemicals and weathering, and furthermore, being uniform in particle size and possessing good dispersibility in vehicles.

By the term "isoindolinone series pigments", used above, is meant pigments represented by the general formula:

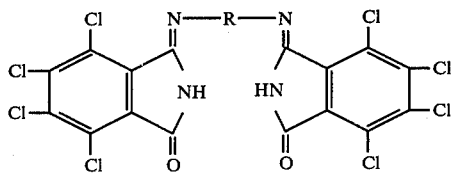

wherein
R represents a carbocyclic bridge member such as:
an unsubstituted phenylene or diphenylene group,
a phenylene or diphenylene group substituted by chlorine atoms, methyl groups or methoxy groups, or
a group expressed by the formula

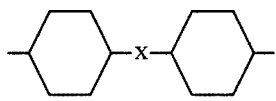

where X is oxygen or a methylene group; or
R represents a heterocyclic bridge member such as:
a pyridylene group; or
R represents a direct bond.

These isoindolinone series pigments are hereinafter referred to as "isoindolinone pigments" for brevity.

2. Description of the Prior Art

Isoindolinone pigments are useful as organic pigments of a high quality. The processes of producing isoindolinone pigments are described in, for example, U.S. Pat. Nos. 2,973,358; 3,076,815 and 2,537,352. Most isoindolinone pigments produced by these and other known processes contain trace amounts of unreacted starting compounds and side-reaction products, and therefore, are not completely satisfactory in their color definition, chroma and fastness to light, chemicals and weathering.

In general the following processes are popularly employed for the purification of organic pigments. Namely, in one process, organic pigments are dissolved in a concentrated acid and, then the solution is diluted thereby to precipitate pigments. For example, quinacridone pigments and phthalocyanine pigments are dissolved in concentrated sulfuric acid and, then, the solution is diluted with water or an alcohol. In another process, organic pigments are converted to a salt form followed by the hydrolysis of the salt by using an acid. For example, quinacridone pigments are treated with an alcoholic potassium hydroxide solution, thereby to form their potassium salts, and then, the potassium salts are hydrolyzed by an acid.

Some proposals have also heretofore been made for the purification of isoindolinone pigments. For example, U.S. Pat. No. 3,758,497 discloses a process wherein an isoindolinone pigment is dispersed in a hydrophilic organic solvent; a base capable of forming a salt is incorporated in the dispersion, thereby to form a salt of the pigment, and; then, the pigment salt is hydrolyzed by means of acid or water in the presence of such amounts of a hydrophilic organic solvent that an extensive degree of dissolution of the pigment salt occurs. The pigment purified by this proposed process is characterized as being in a very finely divided form and possessing excellent transparency. However, this pigment is poor in its hiding power and dispersibility in vehicles, and when it is used in paints, the paints are undesirably highly viscous. Furthermore, in order to obtain a high degree of purification, the proposed process requires the use of an expensive hydrophilic organic solvent, such as dimethylformamide or N-methylpyrrolidone. Such solvent exhibits too high a boiling point so that recovery of the solvent cannot be performed without using a complicated operation. In addition, since a hydrophilic organic solvent is miscible with water, complicated equipment and operations are necessary for its recovery and waste water disposal. Furthermore, when the starting crude isoindolinone pigment is obtained in the dispersed form in a hydrophobic organic solvent (e.g. as described in U.S. Pat. No. 2,973,358), the replacement of the hydrophobic organic solvent by a hydrophilic organic solvent is necessary.

SUMMARY OF THE INVENTION

It now has been found that, when a crude isoindolinone pigment is reacted with a base in an aromatic hydrocarbon medium in the presence of a minor amount of a lower alcohol and/or water, a pigment salt of an extremely high purity is precipitated through the intermediate stage, wherein the reacted pigment is dissolved in the aromatic hydrocarbon medium. When the precipitated pigment salt is separated and then hydrolyzed, a highly purified isoindolinone pigment exhibiting excellent physical properties is obtained. If chlorobenzene or nitrobenzene is used as the aromatic hydrocarbon medium, such a desirable isoindolinone pigment is obtainable, even when the precipitated pigment salt is subjected to hydrolysis directly, i.e., without separation of the precipitated pigment salt. In the case wherein chlorobenzene or nitrobenzene is used, the pigment salt can be hydrolyzed at an acceptable rate of reaction, although the pigment salt is in the form of not a solution but a suspension. Furthermore, the resulting pigment has satisfactory pigment characteristics and is uniform in size.

In accordance with the process of the present invention, there is provided a process for purifying a crude isoindolinone series pigment which comprises the steps of:

dispersing in an aromatic hydrocarbon a crude isoindolinone pigment represented by the general formula:

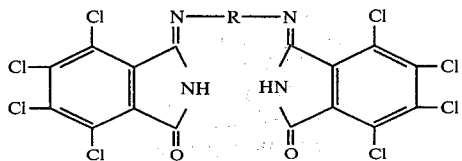

wherein R represents a carbocyclic bridge member such as:

an unsubstituted phenylene or diphenylene group, a phenylene or diphenylene group substituted by chlorine atoms, methyl groups or methoxy groups, or a group expressed by the formula

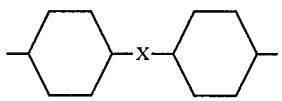

where X is oxygen or a methylene group; or

R represents a heterocyclic bridge member such as:

a pyridylene group; or

R represents a direct bond;

incorporating in the crude isoindolinone pigment dispersion (a) an alcoholate or hydroxide of an alkali metal and (b) at least one compound selected from the group consisting of a lower alcohol having 1 to 4 carbon atoms and water, thereby forming an alkali metal salt of the applied isoindolinone pigment;

optionally, separating the so formed alkali metal salt from the dispersion and, then, dispersing the separated alkali metal salt in water or an aromatic hydrocarbon, and; thereafter, contacting the alkali metal salt with an acid, thereby hydrolyzing said alkali metal salt.

The starting crude isoindolinone pigments to be purified by the process of the invention are not particulary limited, and can be produced according to known methods. Particularly, crude isoindolinone pigments prepared by condensing 3,3,4,5,6,7-hexachloroisoindolin-1-one with a diamine in an aromatic hydrocarbon medium are advantageously used in the process of the invention, because there is no need of separating the crude isoindolinone pigments from the aromatic hydrocarbon medium for use in the process of the invention.

The isoindolinone pigments represented by the above-mentioned general formula include, for example bis-(4,5,6,7-tetrachloroisoindolin-1-one-3-ylidene)-toluylenediamine(2,6), bis-(4,5,6,7-tetrachloroisoindolin-1-one-3-ylidene)-phenylenediamine(1,3), bis-(4,5,6,7-tetrachloroisoindolin-1-one-3-ylidene)-hydrazine, bis-(4,5,6,7-tetrachloroisoindolin-1-one-3-ylidene)-diphenylenediamine(4,4'), bis-(4,5,6,7-tetrachloroisoindolin-1-one-3-ylidene)-3,3'-dimethyl-diphenylenediamine-(4,4') and bis-(4,5,6,7-tetrachloroisoindolin-1-one-3-ylidene)-2-methoxy-phenylenediamine(1,4).

The aromatic hydrocarbon medium used includes, for example, benzene, halogenated benzene, nitrobenzene and alkyl-substituted benzene. Of these aromatic hydrocarbons, monochlorobenzene, o-dichlorobenzene, 1,2,3-trichlorobenzene and nitrobenzene are particularly suitable, because of their capability of dissolving intermediate compounds produced midway in the course of forming the isoindolinone pigment salt and their capability of dissolving impurities present in the starting crude isoindolinone pigment. These aromatic hydrocarbons may be used either alone or in combination. The amount of the aromatic hydrocarbon is not specifically limited, but said amount is preferably in the range of from 3 to 20 parts by weight, based on one part by weight of the crude isoindolinone pigment.

Bases, capable of salt formation and suitable for the process of the invention, are also not particularly limited. Most alcoholates and hydroxides of an alkali metal can be used. Of these alcoholates and hydroxides, alkali metal alcoholates and hydroxides, such as sodium methylate, sodium ethylate, potassium hydroxide and sodium hydroxide, are advantageous, because these alkali metal alcoholates and hydroxides are readily available and possess good reactivity. The amount of these bases is usually at least two moles, preferably in the range of from 2 to 2.5 moles, per mole of the isoindolinone pigment.

The lower alcohols used are those which have 1 to 4 carbon atoms, and include, for example, methanol, ethanol, n-propanol, iso-propanol, n-butanol, sec-butanol and ethylene glycol. Of these lower alcohols, the use of methanol or ethanol in combination with sodium methylate or sodium ethylate, respectively, is particularly advantageous in view of easiness of the solvent recovery. In place of the lower alcohol, a mixture of water and the lower alcohol or water alone may be used.

The amount of the lower alcohol the mixture of the lower alcohol and water or the water alone may be varied depending upon the particular isoindolinone pigment, the particular aromatic hydrocarbon and the amount thereof, and the particular base and the amount thereof. The amount of the lower alcohol, the lower alcohol-water mixture or the water alone is usually at least 0.1 part by weight, based on one part by weight of the isoindolinone pigment. However, when an excessive amount of the lower alcohol, the lower alcohol-water mixture or the water alone is used, the formed pigment salt partially dissolves in the aromatic hydrocarbon medium, and thus, the percentage recovery of the pigment salt upon separation of the pigment salt from the aromatic hydrocarbon medium is liable to be reduced. Accordingly, the amount of the lower alcohol, the lower alcohol-water mixture or the water alone is preferably within the range of from 0.1 to 0.5 part by weight based on one part by weight of the pigment.

When the predetermined amount of an alcoholate or hydroxide of an alkali metal and the predetermined amount of a lower alcohol, a lower alcohol-water mixture or water alone are incorporated into the dispersion of a crude isoindolinone pigment in an aromatic hydrocarbon, the reaction of the pigment salt formation proceeds at an enhanced rate. Midway in the course of the pigment salt formation, it is observed that the pigment dispersion becomes a clear solution due to the formation of an intermediate of the pigment salt. Immediately thereafter, the pigment salt precipitates. The reaction may be carried out at room temperature or higher. The reaction temperature is preferably in the range of from 40° to 70° C. in view of the more enhanced rate of reaction.

The isoindolinone pigment salt may be subjected to hydrolysis as it is in the form of being suspended in the aromatic hydrocarbon medium. It is, however, more advantageous that the pigment salt be separated from the aromatic hydrocarbon medium, optionally washed with an aromatic hydrocarbon and, then, dispersed in an aromatic hydrocarbon or water, followed by the hydrolysis of the pigment salt. The acid used for the hydrolysis includes, for example, an organic acid, such as acetic acid, and an inorganic acid. Acetic acid is preferable because it is readily miscible with the reaction medium. It is also preferable to blow a hydrogen chloride gas or a carbon dioxide gas into the pigment salt dispersion.

In the case where the separated pigment salt is dispersed in water for the hydrolysis thereof, it is advantageous to use a suitable amount of a dispersant because the resulting free acid form pigment exhibits an enhanced dispersibility in vehicles, as compared with the free acid form pigment obtained without the use of a dispersant. The dispersant may be selected from anionic, nonionic and cationic surface active agents. Particularly, an alkali metal salt of a higher fatty acid, an alkylbenzenesulfonic acid salt, a higher aliphatic sulfonic acid salt and a higher alcohol surface active agent are conveniently used.

The advantages of the process of the invention are summarized as follows.

(1) The aromatic hydrocarbon medium has a high dissolving power for unreacted raw materials and side-reaction products, which materials and products are contained in the starting crude isoindolinone pigment, and therefore, produces a satisfactory purifying effect. The purifying effect is more enhanced by the fact that a soluble intermediate of the pigment is formed midway in the course of the pigment salt formation, that is, impurities present inside the pigment particles can be dissolved into the aromatic hydrocarbon medium.

(2) The pigment salt is insoluble in the aromatic hydrocarbon medium and, therefore, easy to separate therefrom.

(3) In general isoindolinone pigments are prepared by condensing 3,3,4,5,6,7-hexachloroisoindolin-1-one with a diamine in an aromatic hydrocarbon medium. Accordingly, the so prepared isoindolinone pigment dispersion can be used, as it is, i.e. without separation of the pigment from the hydrocarbon medium, in the process of the invention.

(4) In the case where the pigment salt is separated from the aromatic hydrocarbon medium and, then, dispersed in an aromatic hydrocarbon medium for the hydrolysis thereof, the resulting free acid form pigment exhibits a very high purity, as well as extremely enhanced color definition and fastness, compared with the free acid form pigment produced by hydrolyzing the pigment salt without the separation thereof from the hydrocarbon medium.

(5) The isoindolinone pigment obtained by the process of the invention exhibits satisfactory pigment characteristics in purity, chroma as well as fastness to light, chemicals and weathering, as illustrated in the Examples below.

The invention will be further described by the following examples, wherein parts and percentages are based on weight unless otherwise specified. The specific surface area of pigments was determined according to the BET method.

EXAMPLE 1

20 parts of a bis-(4,5,6,7-tetrachloroisoindolin-1-one-3-ylidene)-toluylenediamine(2,6) pigment and 4.5 parts of sodium methylate were dispersed in 300 parts of o-dichlorobenzene followed by heating the slurry, so obtained, to a temperature of approximately 45° C. Then, 5 parts of methanol were poured into the slurry whereby the slurry was changed into a clear yellow solution and, successively therewith, a yellowish brown precipitate was formed therein. After stirring the precipitate-formed slurry at a temperature of approximately 45° C., the slurry was mixed with 4.5 parts of acetic acid, and further, stirred for 30 minutes to obtain a bright yellow pigment in a dispersed state. The pigment was filtered off, washed with methanol and then with water, and finally dried. The yield of the bright yellow pigment was 19.5 parts. The pigment had a specific surface area of 35 $m^2/g$, and was columnar and substantially uniform in size.

With paints containing the above-mentioned pigment, coated films were obtained, which were, compared with those obtained from the starting pigment of the same chemical structure, characterized by extremely high purity and brightness, as well as good fastness to light, heat and weathering.

By a procedure similar to that mentioned above, the starting pigment of the same chemical structure was hydrolyzed by blowing a hydrogen chloride gas into the precipitate-formed slurry, instead of pouring acetic acid therein. The pigment so obtained had similar properties.

EXAMPLE 2

20 parts of a bis-(4,5,6,7-tetrachloroisoindolin-1-one-3-ylidene)-phenylenediamine(1,4) pigment and 5.5 parts of sodium ethylate were dispersed in 300 parts of o-dichlorobenzene, followed by the addition of 8 parts of ethanol. Then, the slurry so obtained was heated to a temperature of 50° C., whereby reaction took place immediately and the shade of the slurry changed from orange to reddish brown. With precipitation of the sodium salt of the applied isoindoline, the slurry became viscous. After the viscous slurry was maintained at a temperature of 50° C. for a period of 30 minutes, while being stirred, the slurry was treated in a manner similar to that mentioned in Example 1, thereby to obtain 19.0 parts of a pigment. The pigment so obtained was, compared with the starting pigment of the same chemical structure, characterized by extremely high purity and brilliance.

The above-mentioned procedure was repeated wherein 5.0 parts of sodium methylate were used instead of 5.5 parts of sodium ethylate and methanol was used instead of ethanol, respectively, with all other conditions remaining substantially the same. The pigments so obtained had similarly valuable properties.

EXAMPLE 3

20 parts of a bis-(4,5,6,7-tetrachloroisoindolin-1-one-3-ylidene)-toluylenediamine(2,6) and 4.0 parts of sodium methylate were dispersed in 300 parts of o-dichlorobenzene. The slurry so obtained was heated, while being vigorously stirred, to a temperature of 80° C. to 90° C. Then, 4 parts of water were added drop by drop to the slurry, and the slurry was maintained at a temperature of 90° C. to 100° C. for a period of 2 hours, whereby the shade of the pigment slurry changed from the original greenish yellow to brown (the shade of the sodium salt). Thereafter, 4 parts of acetic acid were added to the slurry and, then, the slurry was maintained at a temperature of 90° to 100° C. for a period of 30 minutes, while being stirred, whereby a very brilliant yellow pigment was obtained in a dispersed state. The pigment so obtained was filtered off under hot conditions from the dispersion, washed with methanol and then with water and finally dried. The yield of the pigment was 19.5 parts.

When the pigment was used in paints, the coated films exhibited, compared with those obtained from the starting pigment of the same chemical structure, extremely enhanced color definition and brightness, and better fastness to light and weathering.

The specific surface area of the starting pigment and that of the product pigment were approximately 25 $m^2/g$ and 40 $m^2/g$, respectively.

EXAMPLE 4

A dispersion of a brilliant yellow pigment in o-dichlorobenzene, which dispersion was obtained in a manner similar to that mentioned in Example 3, was maintained at a temperature of 150° C. for a period of one hour. The pigment so obtained was filtered off, washed with methanol and then with water, and finally dried. The pigment so obtained exhibited valuable properties simila to the pigment obtained in Example 3. The pigment of this example had a specific surface area of 32 $m^2/g$, and exhibited, compared with the pigment obtained in Example 3, better hiding power and dispersibility.

EXAMPLE 5

20 parts of a bis-(4,5,6,7-tetrachloroisoindolin-1-one-3-ylidene)-phenylenediamine(1,4) and 5.0 parts of sodium ethylate were dispersed in 300 parts of o-dichlorobenzene followed by the addition of 4.0 parts of water. The slurry so obtained was maintained at a temperature of 90° to 100° C. for a period of one hour, while being well stirred, whereby a red pigment solution of the sodium salt of the applied isoindolinone was formed. 4.0 parts of acetic acid were incorporated into the red pigment solution, and the solution was maintained at a temperature of 90° to 100° C. for 30 minutes, whereby the sodium salt was hydrolyzed to precipitate a reddish yellow pigment. The pigment was filtered off, washed with methanol and then with water, and finally dried.

The pigment so obtained exhibited, compared with the starting pigment of the same chemical structure, extremely improved color definition and brightness.

The above-mentioned procedure was repeated wherein monochlorobenzene and 1,2,3-trichlorobenzene were separately used instead of o-dichlorobenzene, with all other conditions remaining substantially the same. The pigment so obtained exhibited similar properties.

EXAMPLE 6

The procedure mentioned in Example 1 was repeated, except that 15 parts of a 28% potassium hydroxide solution in methanol were used instead of 4.5 parts of sodium methylate and 5 parts of methanol, whereby a light yellow slurry of the potassium salt of the applied isoindolinone was formed. This slurry was treated in a manner similar to that mentioned in Example 1, whereby a pigment was obtained which exhibited valuable properties similar to those of the pigment obtained in Example 1.

EXAMPLES 7 THROUGH 10

The procedure mentioned in Example 6 was repeated, except that the starting pigments represented by the following general formula and listed in Table I, below, were separately used instead of the bis-(4,5,6,7-tetrachloroisoindolin-1-one-3-yliden)-toluylenediamine(2,6) pigment, with all other conditions remaining substantially the same.

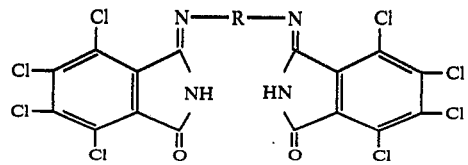

The pigments so obtained had the shades shown in Table I, below, and valuable properties similar to those of the pigment obtained in Example 1.

Table I

| Example No. | R in general formula | Shade of pigment |
| --- | --- | --- |
| 7 | Phenylene(1,3) | Yellow |
| 8 | Toluylene(2,4) CH₃ | Slightly greenish yellow |
| 9 | —(Direct bond) | Yellow |
| 10 | Diphenylene(4,4') | Orange |

EXAMPLE 11

20 parts of a bis-(4,5,6,7-tetrachloroisoindolin-1-one-3-ylidene)-toluylenediamine(2,6) pigment and 4.5 parts of sodium methylate were dispersed in 300 parts of o-dichlorobenzene followed by heating the slurry, so formed, to a temperature of approximately 45° C. Then, 7 parts of methanol were poured into the slurry, whereby the slurry was changed into a clear yellow solution and, successively therewith, a yellowish brown precipitate of the sodium salt of the starting pigment was formed therein. After stirring the sodium salt slurry at a temperature of approximately 45° C., the sodium salt was filtered off, washed with o-dichlorobenzene and then with n-hexane, and finally dried in vacuo.

The sodium salt so obtained was placed in 1,000 parts of an aqueous 3% sulfuric acid solution, and the mixture was stirred for a period of 2 hours, whereby the slurry was neutralized and the sodium salt was hydrolyzed to a free acid form pigment. Then, the pigment was filtered off, washed with water and then dried. The yield of the pigment was 19 parts. The pigment powder had a specific surface area of 38 $m^2/g$.

When the pigment so obtained was used in paints, the coated films exhibited, compared with those formed from the starting pigment of the same chemical structure, extremely enhanced color definition and chroma, as well as good fastness to light, heat and weathering.

The above-mentioned procedure was repeated, except that a 5% hydrochloric acid solution and water were separately used instead of a 3% sulfuric acid to hydrolyze the sodium salt, with all other conditions remaining substantially the same. The pigment so obtained exhibited valuable properties similar to those of the pigment obtained in the above-mentioned procedure.

When the sodium salt was placed in aqueous acid or water for the hydrolysis thereof, 0.2 parts of sodium alkylbenzenesulfonate (dispersant) was incorporated into the aqueous acid or water. This use of the dispersant not only made it ready to disperse the sodium salt pigment in the aqueous acid or water, but also resulted a pigment exhibiting similar valuable properties and improved dispersibility in vehicles.

EXAMPLE 12

20 parts of a bis-(4,5,6,7-tetrachloroisoindolin-1-one-3-ylidene)-phenylenediamine(1,4) pigment and 5.5 parts of sodium ethylate were dispersed in 300 parts of o-dichlorobenzene, followed by the addition of 8 parts of ethanol. Then, the slurry so obtained was heated to a temperature of 50° C., whereby a reaction took place immediately and the shade of the slurry changed from orange to reddish brown. With precipitation of the sodium salt of the applied isoindolinone, the slurry became viscous. After the viscous slurry was maintained at a temperature of 50° C. for a period of 30 minutes, while being stirred, the reddish brown sodium salt was filtered off, and treated in a manner similar to that mentioned in Example 11. The yield was 18.5 parts. The pigment exhibited, compared with the starting pigment of the same chemical structure, extremely enhanced color definition and chroma.

The above-mentioned procedure was repeated, except that 5.0 parts of sodium methylate were used instead of 5.5 parts of sodium ethylate and methanol was used instead of ethanol, respectively, with all other conditions remaining substantially the same. The pigments so obtained had similar valuable properties.

EXAMPLE 13

The procedure mentioned in Example 11 was repeated, except that 15 parts of a 28% potassium hydroxide solution in methanol were used instead of 4.5 parts of sodium methylate and 7 parts of methanol, whereby a light yellow slurry of the potassium salt of the applied isoindolin one was formed. This slurry was treated in a manner similar to that mentioned in Example 11, whereby a pigment was obtained which exhibited valuable properties similar to those of the pigment obtained in Example 11.

EXAMPLES 14 THROUGH 18

The procedure mentioned in Example 13 was repeated, except that the starting pigments represented by the general formula shown in Examples 7 through 10 and listed in Table II, below, were separately used instead of the bis-(4,5,6,7-tetrachloroisoindolin-1-one-3-ylidene)-toluylenediamine(2,6) pigment, with all other conditions remaining substantially the same. The pigments so obtained had the shades shown in Table II, below, the valuable properties similar to those of the pigment obtained in Example 11.

Table II

| Example No. | R in general formula in Examples 7-10 | Shade of pigment |
|---|---|---|
| 14 | —⌬—O—⌬— | Orange |
| 15 | —⌬—⌬— with CH₃O, OCH₃ | Red |
| 16 | pyridine ring | Yellow |
| 17 | —⌬—CH₂—⌬— | Pale Yellow |
| 18 | —⌬—⌬— with Cl, Cl | Orange |

EXAMPLE 19

The procedure mentioned in Example 11 was repeated, except that 6.5 parts of an aqueous 48% sodium hydroxide solution and 8 parts of methanol were used instead of 4.5 parts of sodium methylate and 7 parts of methanol, whereby a light yellow slurry of the potassium salt of the applied isoindolinone was formed. This slurry was treated in a manner similar to that mentioned in Example 11, whereby a pigment was obtained which exhibited valuable properties similar to those of the pigment obtained in Example 11.

EXAMPLE 20

3,3,4,5,6,7-Hexachloroisoindolin-1-one and 2,6-toluylenediamine were reacted with each other in an o-dichlorobenzene medium, whereby a slurry of a yellow bis-(4,5,6,7-tetrachloroisoindoline-1-one-3-ylidene)-toluylenediamine(2,6) pigment in o-dichlorobenzene was formed. 300 parts of the slurry (content of the pigment=18 parts) were maintained at a temperature of 50° C., and 5 parts of sodium methylate and 8 parts of methanol were incorporated into the slurry, whereby the slurry was changed to a clear solution and, successively therewith, a yellowish brown precipitate of the sodium salt was formed therein. The sodium salt was treated in a manner similar to that mentioned in Example 11, thereby to obtain 17.5 parts of a yellow pigment.

The pigment so obtained exhibited extremely enhanced color definition, chroma and brightness as well as better fastness to light and heat, compared with the pigment collected directly from the above-mentioned slurry by filtering the slurry and washing the filtrate with o-dichlorobenzene, methanol, and then, acetone.

The above-mentioned procedure was repeated, except that monochlorobenzene and 1,2,3-trichlorobenzene were separately used instead of o-dichlorobenzene, with all other conditions remaining substantially the same. The pigments so obtained had similar valuable properties.

EXAMPLE 21

20 parts of a bis-(4,5,6,7-tetrachloroisoindolin-1-one-3-ylidene)-toluylenediamine (2,6) pigment and 4,5 parts of sodium methylate were dispersed in 300 parts of o-dichlorobenzene, followed by heating the slurry, so formed, to a temperature of approximately 45° C. Then, 5 parts of methanol were poured into the slurry, whereby the slurry was changed into a clear yellow solution and, successively therewith, a yellowish brown precipitate of the sodium salt of the starting pigment was formed therein. After stirring the sodium salt-formed slurry at a temperature of approximately 45° C., the sodium salt was filtered off, and washed with 100 parts of o-dichlorobenzene. The wet cake, so obtained, of the sodium salt with o-dichlorobenzene, was dispersed in 300 parts of o-dichlorobenzene followed by addition of 4.5 parts of acetic acid. The slurry, so formed, was stirred for 30 minutes, whereby a very brilliant yellow pigment was obtained in a dispersed state. Then, the pigment was filtered off, washed with methanol and then with water, and finally dried. The yield was 18.8 parts.

The pigment had a specific surface area of 35 m²/g. The particles of the pigment were columnar and uniform in size. When the pigment was used in paints, the coated films exhibited, compared with those obtained from the starting pigment of the same chemical structure, extremely enhanced color definition and brightness, and better fastness to light and weathering.

The above-mentioned procedure was repeated except that hydrolysis of the sodium salt was effected by blowing a hydrogen chloride gas into the slurry of the sodium salt instead of adding thereinto acetic acid. The pigment so obtained had similar valuable properties.

EXAMPLE 22

20 parts of a bis-(4,5,6,7-tetrachloroisoindolin-1-one-3-ylidene)-phenylenediamine(1,4) pigment and 5.5 parts of sodium ethylate were dispersed in 300 parts of o-dichlorobenzene, followed by the addition of 8 parts of ethanol. Then, the slurry so obtained was heated to a temperature of 50° C., whereby a reaction took place immediately and the shade of the slurry changed from orange to reddish brown. With precipitation of the sodium salt of the applied isoindolinone, the slurry became viscous. After the viscous slurry was maintained at a temperature of 50° C. for a period of 30 minutes, while being stirred, the reddish brown sodium salt was filtered, and washed with o-dichlorobenzene to obtain a wet cake. The wet cake was treated in a manner similar to that mentioned in Example 21. The yield was 19.0 parts. The pigment exhibited, compared with the starting pigment of the same chemical structure, extremely enhanced color definition and chroma.

The above-mentioned procedure was repeated, except that 5.0 parts of sodium methylate were used instead of 5.5 parts of sodium ethylate and ethanol was used instead of methanol, with all other conditions remaining substantially the same. The pigment so obtained had similar valuable properties.

EXAMPLE 23

20 parts of a bis-(4,5,6,7-tetrachloroisoindolin-1-one-3-ylidene)-toluylenediamine(2,6) and 4.0 parts of sodium methylate were dispersed in 300 parts of o-dichlorobenzene. The slurry so obtained was heated, while being vigorously stirred, to a temperature of 80° to 90° C. Then, 4 parts of water were added drop by drop to the slurry and the slurry was maintained at a temperature of 90° to 100° C. for a period of 2 hours, whereby the shade of the pigment slurry changed from the original greenish yellow to brown (the shade of the sodium salt). The sodium salt was filtered off, and then washed with o-dichlorobenzene to obtain a wet cake. The wet cake was treated in a manner similar to that mentioned in Example 20, thereby to obtain 19.2 parts of a pigment. The pigment exhibited, compared with the starting pigment of the same chemical structure, far enhanced color definition and brightness as well as better fastness to light, heat and weathering. The specific surface area of the starting pigment and that of the product pigment were approximately 25 m²/g and 40 m²/g, respectively.

Comparative Example 1

15 g of a bis-(4,5,6,7-tetrachlors-isoindolin-3-one-1-ylidene)-toluylenediamine(2,6) pigment were dispersed in 500 ml of N,N-dimethylformamide. 50 ml of an 1 N methanolic sodium methylate solution were poured into the slurry, so obtained, whereby a yellow solution of the sodium salt of the applied isoindolinone was formed. Then, the solution was mixed with 1,000 ml of water and 20 ml of acetic acid, to neutralize the solution. Thus, a finely divided pigment was obtained.

When the pigment was used in paints, the coated films exhibited, compared with those obtained in Example 1, less color definition, less chroma and less brightness. Furthermore, the pigment was poor in dispersibility in vehicles, and the paints were undesirably viscous. The specific surface area was 70 m²/g.

Comparative Example 2

The procedure mentioned in Example 1 was repeated except that, instead of methanol, an equal amount of N,N-dimethylformamide was used, with all other conditions remaining substantially the same. The sodium salt pigment was not formed.

Comparative Example 3

The procedure mentioned in Example 1 was repeated, except that n-hexane was used instead of o-dichlorobenzene, with all other conditions remaining substantially the same. The sodium salt pigment was not formed.

Comparative Example 4

The procedure mentioned in Example 1 was repeated, except that, instead of o-dichlorobenzene, and equal amount of methanol was used, with all other conditions remaining substantially the same. No shade change of the slurry was observed. The sodium salt pigment was formed only to a negligible extent.

What we claim is:

1. A process for purifying a crude isionodolinone series pigment which comprises the steps of:
dispersing in an aromatic compound which is an aromatic hydrocarbon, halogenated aromatic hydrocarbon or nitrobenzene, a crude isoindolinone pigment represented by the following general formula:

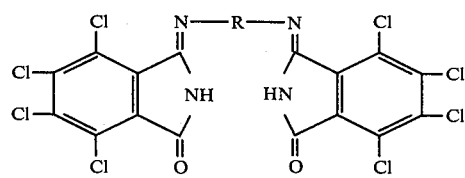

wherein R represents
an unsubstituted phenylene or diphenylene group,
a phenylene or diphenylene group substituted by chlorine atoms, methyl groups or methoxy groups,
a group expressed by the formula

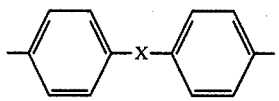

where X is oxygen or a methylene group,
a pyridylene group, or
a direct bond
incorporating in the crude isoindolinone pigment dispersion (a) an alcoholate or hydroxide of an alkali metal and (b) at least one compound selected from the group consisting of a lower alcohol having 1 to 4 carbon atoms and water, thereby forming an alkali metal salt of the isoindolinone pigment; and then,
hydrolyzing the so-formed alkali metal salt of the isoindolinone pigment with acid.

2. A process according to claim 1 wherein the the aromatic compound is a halogenated aromatic hydrocarbon.

3. A process according to claim 2 wherein the halogenated aromatic compound is selected from the group consisting of monochlorobenzene, o-dichlorobenzene and 1,2,3-trichlorobenzene.

4. A process according to any one of claims 2 to 3 or 1 wherein the alcoholate of an alkali metal is at least one compound selected from the group consisting of sodium methylate and sodium ethylate.

5. A process according to any one of claims 2 to 3 or 1 wherein the hydroxide of an alkali metal is at least one compound selected from the group consisting of sodium hydroxide and potassium hydroxide.

6. A process according to any one of claims 2 to 3 or 1 wherein the amount of the lower alcohol is in the range of from 0.1 to 0.5 part by weight based on one part by weight of the crude isoindolinone pigment.

7. A process according to any one of claims 2 to 3 or 1 wherein the lower alcohol is selected from the group consisting of methanol and ethanol.

8. A process according to claim 1 wherein the alkali metal salt of the isoindolinone pigment is separated from the dispersion thereof and thereafter dispersed in water, and then an acid is incorporated into the so-formed aqueous dispersion thereby to hydrolyze said alkali metal salt.

9. A process according to claim 8 wherein the separated alkali metal salt of the isoindolinone pigment is dispersed in water by using a dispersant.

10. A process according to claim 9 wherein the dispersant is at least one surface active agent selected from the group consisting of alkali metal salts of a higher fatty acid, alkylbenzenesulfonic acid salts, higher aliphatic sulfonic acid salts and higher alcohols.

11. A process according to claim 1 wherein the alkali metal salt of the isoindolinone pigment is separated from the dispersion thereof and thereafter dispersed in an aromatic hydrocarbon or halogenated aromatic hydrocarbon, and then an acid is incorporated into the so-formed dispersion thereby to hydrolyze said alkali metal salt.

12. A process according to claim 11 wherein the halogenated aromatic hydrocarbon is selected from the group consisting of monochlorobenzene, o-dichlorobenzene and 1,2,3-trichlorobenzene.

13. A process according to any one of claims 1, 8 and 11 wherein the acid is acetic acid.

14. A process according to claim 1 wherein hydrogen chloride gas is introduced into the dispersion of the alkali metal salt of the applied isoindolinone pigment thereby hydrolyzing said alkali metal salt.

* * * * *